(12) United States Patent
Hagino et al.

(10) Patent No.: US 8,879,068 B2
(45) Date of Patent: Nov. 4, 2014

(54) ABSCISSA CALIBRATION JIG AND ABSCISSA CALIBRATION METHOD OF LASER INTERFERENCE MEASURING APPARATUS

(75) Inventors: Takeshi Hagino, Tsukuba (JP); Yuichiro Yokoyama, Tsukuba (JP); Yutaka Kuriyama, Tsukuba (JP)

(73) Assignee: Mitutoyo Corporation, Kanagawa (JP)

( * ) Notice: Subject to any disclaimer, the term of this patent is extended or adjusted under 35 U.S.C. 154(b) by 82 days.

(21) Appl. No.: 13/554,130

(22) Filed: Jul. 20, 2012

(65) Prior Publication Data

US 2013/0021614 A1    Jan. 24, 2013

(30) Foreign Application Priority Data

Jul. 22, 2011    (JP) .................................. 2011-160606

(51) Int. Cl.
*G01B 9/02* (2006.01)
*G01B 11/00* (2006.01)

(52) U.S. Cl.
CPC ...................................... *G01B 11/00* (2013.01)
USPC ....................................................... 356/450

(58) Field of Classification Search
USPC ......... 356/141, 255, 500, 511–515, 450, 614, 356/708, 490; 248/278.1, 487, 661; 348/373
See application file for complete search history.

(56) References Cited

U.S. PATENT DOCUMENTS

| | | | | |
|---|---|---|---|---|
| 3,234,652 A * | 2/1966 | Smith | .............................. | 33/277 |
| 3,363,504 A * | 1/1968 | Lill | ................................ | 359/855 |
| 4,343,550 A * | 8/1982 | Buckley et al. | .............. | 356/4.01 |
| 5,396,326 A * | 3/1995 | Knobbe et al. | ................ | 356/255 |
| 5,966,991 A * | 10/1999 | Gosselin et al. | ............. | 74/490.1 |
| 6,324,024 B1 * | 11/2001 | Shirai et al. | .................... | 359/884 |
| 6,734,979 B2 * | 5/2004 | Evans et al. | .................... | 356/512 |
| 6,816,267 B2 * | 11/2004 | Evans et al. | .................... | 356/515 |
| 6,969,033 B2 * | 11/2005 | van der Linden | .......... | 248/177.1 |
| 7,489,407 B2 * | 2/2009 | Hill et al. | ....................... | 356/508 |
| 7,686,458 B2 * | 3/2010 | Aizawa et al. | ................ | 353/98 |
| 7,880,865 B2 * | 2/2011 | Tanaka et al. | ................ | 356/4.01 |
| 7,940,443 B2 * | 5/2011 | Maeno et al. | ............... | 359/212.1 |
| 8,294,902 B2 * | 10/2012 | Oota | .............................. | 356/511 |
| 2002/0080366 A1 * | 6/2002 | Nakayama | ..................... | 356/512 |
| 2007/0076946 A1 | 4/2007 | Kunisaki et al. | | |
| 2010/0142798 A1 * | 6/2010 | Weston et al. | ................ | 382/141 |
| 2010/0320356 A1 * | 12/2010 | Maillard | ....................... | 248/487 |

FOREIGN PATENT DOCUMENTS

| | | |
|---|---|---|
| JP | 2002-206915 | 7/2002 |
| JP | 2007-327892 | 12/2007 |

OTHER PUBLICATIONS

Ulf Griesmann, Quandou Wang, Johannes Soons, and Remi Carakos, "A Simple Ball Averager for Reference Sphere Calibrations," Proc. of SPIE vol. 5869 58690S-1 (2005).*
Search report from E.P.O., mail date is Nov. 2, 2012.

* cited by examiner

*Primary Examiner* — Kara E Geisel
*Assistant Examiner* — Violeta A Prieto
(74) *Attorney, Agent, or Firm* — Greenblum & Bernstein, P.L.C.

(57) ABSTRACT

An abscissa calibration jig of a laser interference measuring apparatus, includes: an image projection unit configured to project an image with a marker; a first support mechanism configured to rotatably support the image projection unit around a first rotation axis passing a predetermined rotation center; and a second support mechanism configured to rotatably support the first support mechanism around a second rotation axis crossing the first rotation axis at the rotation center.

3 Claims, 11 Drawing Sheets

ABSCISSA CALIBRATION JIG AND ABSCISSA CALIBRATION METHOD OF LASER INTERFERENCE MEASURING APPARATUS

BACKGROUND

1. Field of the Invention

The present invention relates to an abscissa calibration jig and an abscissa calibration method of a laser interference measuring apparatus. Particularly, it relates to calibration of a position on a measurement plane in a laser interference measuring apparatus having a convergent optics.

2. Description of the Related Art

Apparatuses called laser interferometers or laser interference measuring apparatuses have been heretofore used widely for precisely measuring the surface texture or the surface shape of an object to be measured. A measured value obtained by the laser interference measuring apparatus is acquired as a measured value of the height of the surface of the object to be measured. The measured value is used as feedback data for evaluation of the shape of the surface of the object to be measured, the step of processing the object to be measured, or the like. In such an application, it is necessary to accurately know the position to which measured data obtained by the laser interference measuring apparatus corresponds on the surface of the object to be measured, that is, the abscissa (two-dimensional position perpendicular to the optical axis of laser light). That is, when there is an abnormal value in the measured data, correction or the like cannot be performed accurately if the point where the abnormal value has occurred cannot be identified precisely.

In a laser interference measuring apparatus according to the background art, an image of interference fringes is generally acquired by a two-dimensional light receiving unit such as a CCD camera. Therefore, the aforementioned abscissa is evaluated in the laser interference measuring apparatus based on the position to which each light receiving element arrayed two-dimensionally in the light receiving unit such as a CCD camera corresponds on the surface of the object to be measured. The correspondence relation in the abscissa between the surface position of the object to be measured and the light receiving unit may get out of an ideal correspondence relation due to image distortion caused by the properties of an optics contained in the laser interference measuring apparatus, or the influence of a difference between longitudinal and lateral magnifications.

In an application in which the laser interference measuring apparatus measures a planar shape, the abscissa can be evaluated or correction or the like using an evaluated value of the abscissa can be performed when a standard or the like having a known shape like a two-dimensional array is measured.

On the other hand, when the spherical surface shape of an object to be measured is measured using a convergent optics, image distortion is also produced when the spherical shape is developed into a planar image in a two-dimensional imaging device, in addition to the image distortion or the difference between longitudinal and lateral magnifications. For example, there is a little change when an image located near the equator of the spherical surface is projected onto a plane, but there is a greater difference when an image located more distantly from the equator is projected onto a plane. A spherical surface shape is developed thus on a plane by nonlinear conversion. Therefore, more careful evaluation of the abscissas is required.

A method disclosed in JP-A-2007-327892 or JP-A-2002-206915 has been proposed as a method for correcting the abscissas in an interference measuring apparatus when the case where such a convergent optics is used is taken into consideration. JP-A-2007-327892 has given description to a method in which an object to be inspected and a light shielding plate having a contour shape calibrated in advance are measured integrally and the measured shape of the light shielding plate and the calibrated shape are compared to evaluate the abscissas. JP-A-2007-327892 has given description to an evaluation method corresponding to an object to be inspected having a spherical surface.

JP-A-2002-206915 has given description that a reflective optical element having a predetermined pattern is placed on a plane in a position where an object to be inspected is placed, and a measured value of the pattern is compared with the calibrated value so as to calibrate the abscissa. In JP-A-2002-206915, a reflection portion of the reflective optical element is a diffraction grating so that the angle of reflection of light thereof is made the same as that in the case where an object to be inspected having a spherical surface is measured. In this method, an abscissa error having nonlinearity can be evaluated.

However, the contour shape is limited to a circle in the case of JP-A-2007-327892. Such a method has an effect in evaluation of a lower-order abscissa error such as a difference between longitudinal and lateral in magnifications, but has a limited effect in evaluation of an abscissa error which has a higher-order term or which is nonlinear. On the other hand, according to JP-A-2002-206915, an abscissa error having nonlinearity can be evaluated. Even in the present level of technology, however, it is supposed that production of a diffraction grating as in JP-A-2002-206915 involves great difficulty.

For example, assume that ρ designates a distance between a point on a reflective optical element and the center of the element, and θ designates an angle between a light beam of convergent luminous flux reaching the point and the optical axis of an interferometer. In this case, the angle of reflection required in a concentric position where the distance from the center of the element is ρ is expressed by θ. In addition, the relation in which ρ is proportional to TAN θ is established between the distance ρ and the angle θ. That is, the reflective optical element is required to have an optical characteristic in which the angle of reflection changes smoothly in proportion to TAN θ in accordance with the distance ρ from the center. It is not easy to manufacture such an element strictly. Further, when such a planar object to be measured is placed in a convergent optics, it is difficult to adjust the focus of the interferometer all over the visual field of an image. There may be considered a problem that it is difficult to perform precise measurement for evaluating the abscissa.

SUMMARY

A primary object of the invention is to provide an abscissa calibration jig and an abscissa calibration method of a laser interference measuring apparatus having a convergent optics, in which a position on a measuring plane in the laser interference measuring apparatus can be calibrated easily and precisely.

According to an aspect of the invention, there is provided an abscissa calibration jig of a laser interference measuring apparatus includes: an image projection unit configured to project an image with a marker; a first support mechanism configured to rotatably support the image projection unit around a first rotation axis passing a predetermined rotation center; and a second support mechanism configured to rotatably support the first support mechanism around a second rotation axis crossing the first rotation axis at the rotation center.

In such an abscissa calibration jig according to the invention, the image projection unit is supported by the first support mechanism and the second support mechanism and rotated around the first rotation axis and the second rotation axis so that an image can be projected in an arbitrary direction. In order to calibrate the laser interference measuring apparatus, the abscissa calibration jig is disposed so that the focal position of a convergent optics of the laser interference measuring apparatus to be calibrated aligns with the rotation center of the abscissa calibration jig. In this state, an image is projected from the image projection unit so that the image is received by the light receiving unit of the laser interference measuring apparatus. The projected image has a marker at one point on the image. Distortion or the like in the convergent optics of the laser interference measuring apparatus can be detected by examination of the correspondence between the coordinates (corresponding to actually measured abscissas of the marker or abscissas in the light receiving unit) of the marker and the coordinates (corresponding to reference abscissas of the marker or the abscissas in an object to be measured) calculated from the current angle positions of the first support mechanism and the second support mechanism of the abscissa calibration jig. Such correspondence between the abscissas is examined on a part or all of points on the light receiving unit, and correction values are calculated so that the abscissas of the laser interference measuring apparatus can be calibrated easily and precisely.

The abscissa calibration jig of the laser interference measuring apparatus according to the invention may use a configuration in which the image projection unit includes a spherical reflector using the rotation center as a center of curvature, and a non-reflective region provided for forming the marker and formed in a surface of the spherical reflector. In such an abscissa calibration jig according to the invention, the spherical reflector is disposed in the focal position of the convergent optics of the laser interference measuring apparatus. Convergent luminous flux emitted from a laser light source of the laser interference measuring apparatus and then reflected from the spherical reflector is projected on a light receiving unit of the laser interference measuring apparatus. On this occasion, a dark portion caused by the non-reflective region is formed as a marker in the projected image. Accordingly, calibration can be performed based on the relation between the aforementioned marker on the light receiving unit and the angle positions of the first support mechanism and the second support mechanism.

The abscissa calibration jig of the laser interference measuring apparatus according to the invention may use a configuration in which the image projection unit has a planar reflector in which the rotation center is set at one point on a reflective surface thereof, and a laser light source which irradiates the planar reflector with laser light for forming the marker. In such an abscissa calibration jig according to the invention, the planar reflector is disposed in the focal position of the convergent optics of the laser interference measuring apparatus, and laser light emitted from the laser light source outside the laser interference measuring apparatus and reflected by the planar reflector can be projected on the light receiving unit of the laser interference measuring apparatus. On this occasion, a light spot caused by the laser light is formed as a marker in an image acquired by the light receiving unit. Accordingly, calibration can be performed based on the relation between the aforementioned marker on the light receiving unit and the angle positions of the first support mechanism and the second support mechanism.

Incidentally, in the abscissa calibration jig according to the invention, the image projection unit may have the aforementioned configuration in which a spherical reflector or a planar reflector is used or a configuration in which a light projecting unit such as a laser light source is disposed in the focal position of the convergent optics to produce a light spot as a marker in the light receiving unit. In addition, a precise stepping motor or the like provided with a motor and an encoder may be used as each of the first support mechanism and the second support mechanism.

According to an aspect of the invention, there is provided an abscissa calibration method of a laser interference measuring apparatus, including: using an abscissa calibration jig of a laser interference measuring apparatus, including: an image projection unit configured to project an image with a marker; a first support mechanism configured to rotatably support the image projection unit around a first rotation axis passing a predetermined rotation center; and a second support mechanism configured to rotatably support the first support mechanism around a second rotation axis crossing the first rotation axis at the rotation center; placing the abscissa calibration jig in a focal position of a convergent optics of the laser interference measuring apparatus, and aligning the rotation center with the focal position; projecting an image from the image projection unit onto a light receiving unit of the laser interference measuring apparatus; rotating the image projection unit around the first rotation axis and the second rotation axis to move the marker to an arbitrary position on the image; calculating a reference abscissa of the marker from angle positions of the image projection unit around the first rotation axis and the second rotation axis; detecting an actually measured abscissa of the marker in the image acquired by the light receiving unit; and comparing the actually measured abscissa and the reference abscissa of the marker and calibrating an abscissa of the laser interference measuring apparatus.

In such an abscissa calibration method according to the invention, distortion or the like in the convergent optics of the laser interference measuring apparatus can be detected by examination of correspondence between the coordinates (corresponding to actually measured abscissas of the marker or abscissas in the light receiving unit) of the marker and the coordinates (corresponding to reference abscissas of the marker or the abscissas in an object to be measured) calculated from the current angle positions of the first support mechanism and the second support mechanism of the abscissa calibration jig. Such correspondence between the abscissas is examined on a part or all of points on the light receiving unit, and correction values are calculated so that the abscissas of the laser interference measuring apparatus can be calibrated easily and precisely.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

[Target to be Calibrated]

Figure 1:
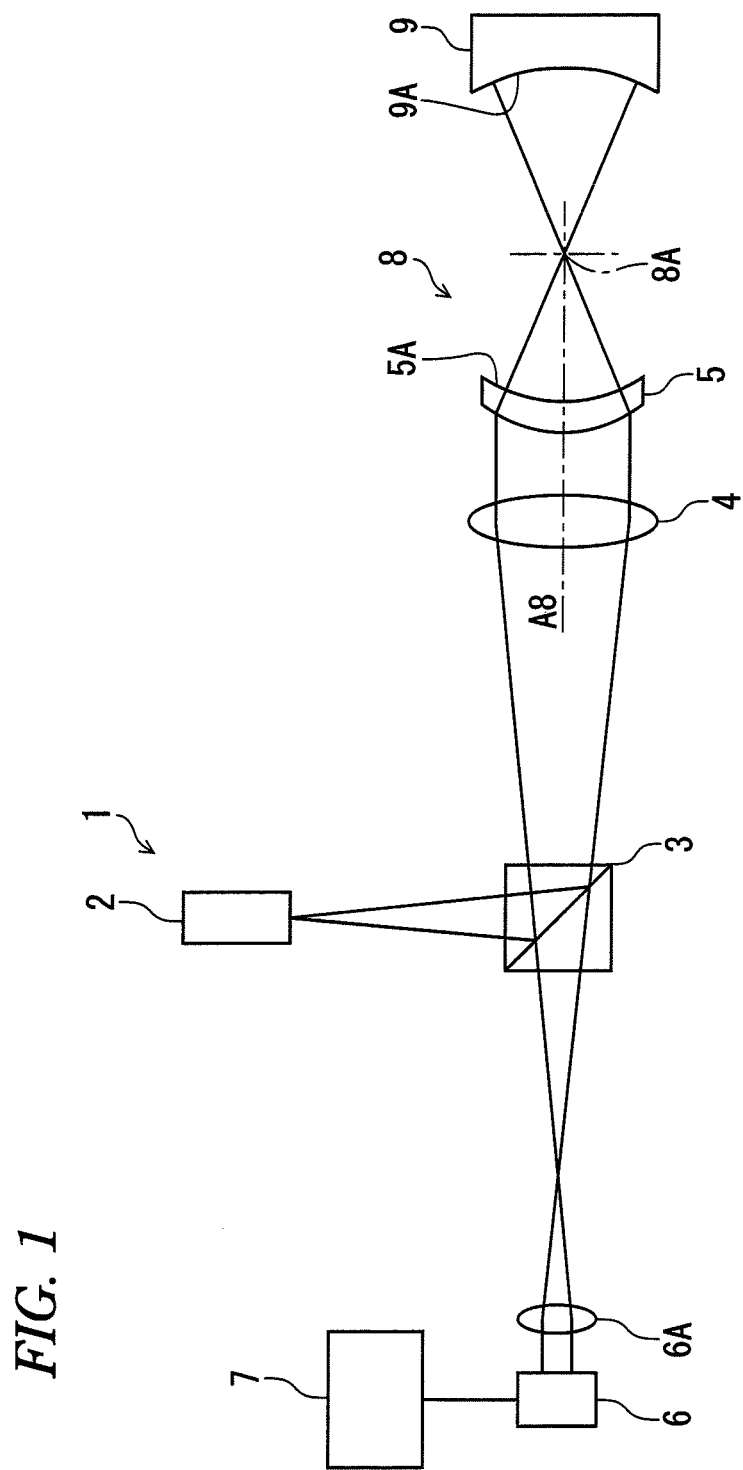
FIG. 1 is a schematic view showing a laser interference measuring apparatus as a target to be calibrated according to the invention.

First, a laser interference measuring apparatus having a convergent optics and serving as a target to be calibrated according to the invention will be described with reference to FIG. 1. In FIG. 1, a laser interference measuring apparatus 1 is a Fizeau laser interferometer, which has a laser light source 2, a semi-transparent mirror 3, a collimator lens 4, a reference standard 5, an observation optics 6A, a light receiving unit 6 and an arithmetic processing unit 7 as a fundamental configuration. Further, the laser interference measuring apparatus 1 has a convergent optics 8 for measuring a measurement spherical surface 9A of an object to be measured 9. In the convergent optics 8, measurement light transmitted through the reference standard 5 formed out of a lens is converged in a focal position 8A which is the center of curvature of the measurement spherical surface 9A. The reference surface of the reference standard 5 is set as a reference spherical surface 5A which is formed into a spherical shape with the focal position 8A as the center.

In such a laser interference measuring apparatus 1, laser light emitted from the laser light source 2 is reflected by the semi-transparent mirror 3 and then converted into parallel luminous flux by the collimator lens 4. The parallel luminous flux from the collimator lens 4 is incident on the reference standard 5 and converted into convergent light. In the reference standard 5, a part of the incident convergent light is reflected by the reference spherical surface 5A and returned as reference light to the collimator lens 4 and the semi-transparent mirror 3. On the other hand, the remaining convergent light transmitted through the reference spherical surface 5A is focused on the focal position 8A and then becomes divergent light which diverges spherically. The divergent light is reflected by the measurement spherical surface 9A of the object to be measured 9 and returned as measurement light to the reference standard 5, the collimator lens 4 and the semi-transparent mirror 3.

Thus, in the semi-transparent mirror 3, the reference light reflected by the reference spherical surface 5A and returned and the measurement light reflected by the measurement spherical surface 9A and returned are mixed and interfere with each other, and projected onto the light receiving unit 6 through the observation optics 6A. Thus, an image including interference fringes of the reference light and the measurement light can be acquired by the light receiving unit 6. Here, when the reference standard 5 is moved by a very small quantity in the direction of the optical axis thereof, the distance between the reference spherical surface 5A and the measurement spherical surface 9A changes so that a plurality of images different in phase state can be acquired. In the arithmetic processing unit 7, phase unwrapping operation is performed using the images of interference fringes obtained by the light receiving unit 6 so that the surface shape of the measurement spherical surface 9A can be calculated.

As described above, the laser interference measuring apparatus 1 as a target to be calibrated according to the invention includes the laser light source 2, the semi-transparent mirror 3, the collimator lens 4, the reference standard 5, the observation optics 6A, the light receiving unit 6, the arithmetic processing unit 7 and the convergent optics 8 (excluding the object to be measured 9) described above.

[First Embodiment]

A first embodiment of the invention is shown in FIGS. 2 to 6. In this embodiment, an abscissa calibration jig 10 (see FIG. 2) according to the invention is applied to the aforementioned laser interference measuring apparatus 1 in FIG. 1 so as to calibrate the abscissas of the laser interference measuring apparatus 1 in a procedure based on an abscissa calibration method according to the invention.

Figure 2:
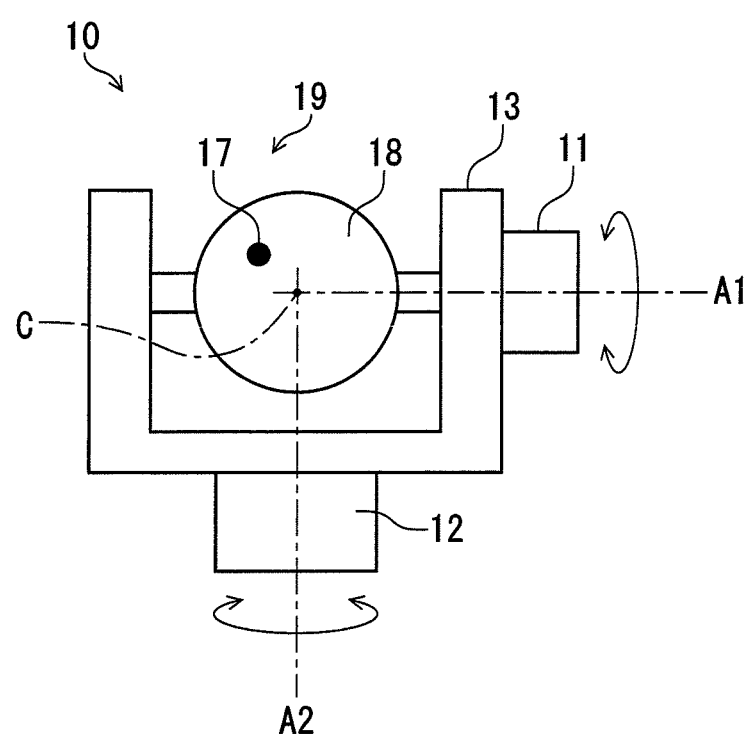
FIG. 2 is a schematic view showing a main portion of a first embodiment of the invention.

In FIG. 2, the abscissa calibration jig 10 has a first support mechanism 11, a second support mechanism 12, a frame 13 and an image projection unit 19. The first support mechanism 11 is placed on the frame 13 so as to support the image projection unit 19 rotatably around a first rotation axis A1. The first rotation axis A1 passes a predetermined rotation center C. The second support mechanism 12 supports the first support mechanism 11 through the frame 13 rotatably around a second rotation axis A2. The second rotation axis A2 crosses the first rotation axis A1 at the rotation center C.

Not-shown drive units such as motors for rotating the first support mechanism 11 and the second support mechanism 12 in accordance with operation commands from the arithmetic processing unit 7 are attached to the first support mechanism 11 and the second support mechanism 12 respectively. In addition, angle detectors for detecting the rotation angle positions of the first support mechanism 11 and the second support mechanism 12 are attached to the first support mechanism 11 and the second support mechanism 12 respectively, so that the arithmetic processing unit 7 can detect the angle position around the first rotation axis A1 and the angle position around the second rotation axis A2 and infer the direction of the image projection unit 19 from the detected angle positions.

The image projection unit 19 projects an image with a marker onto the light receiving unit 6. The image projection unit 19 has a spherical reflector 18 and a non-reflective region 17 formed in the surface of the spherical reflector 18. The spherical reflector 18 has a spherical body supported by the first support mechanism 11. The surface of the spherical reflector 18 is a spherical surface whose curvature center corresponds to the rotation center C. One or both of the halves of the surface of the spherical reflector 18 is formed as a reflective surface. The non-reflective region 17 is a region formed in the surface of the spherical reflector 18 and having a different reflection performance from that of the surrounding. For example, the non-reflective region 17 is formed by processing the surface of the spherical reflector 18 by minute imprinting or the like so that the non-reflective region 17 can scatter or absorb the emitted light.

Figure 3:
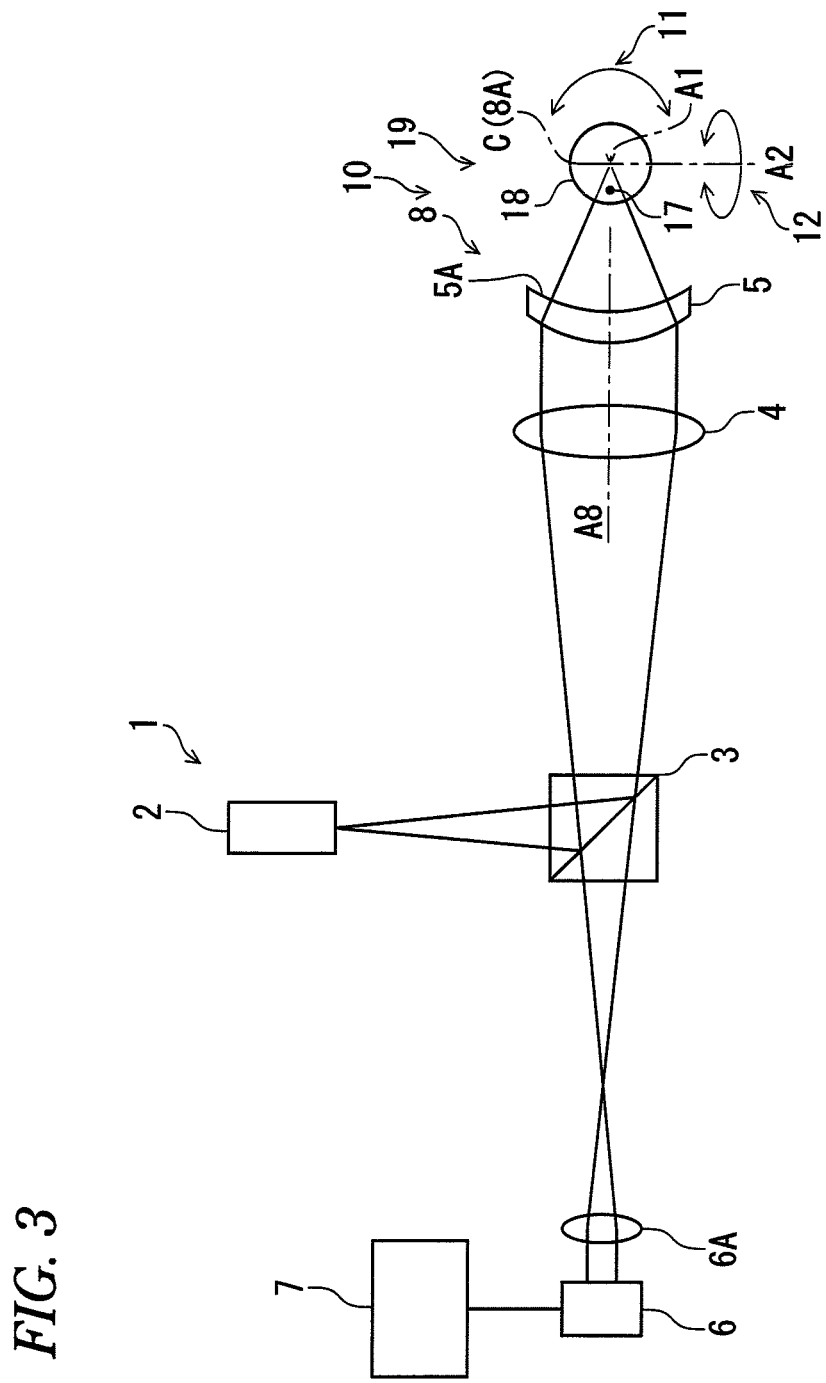
FIG. 3 is a schematic view showing an apparatus configuration of the first embodiment.

In this embodiment, the aforementioned abscissa calibration jig 10 in FIG. 2 is incorporated in the aforementioned laser interference measuring apparatus 1 in FIG. 1 for performing calibration work. In FIG. 3, the laser interference measuring apparatus 1 and the laser light source 2, the semitransparent mirror 3, the collimator lens 4, the reference standard 5, the observation optics 6A, the light receiving unit 6 and the arithmetic processing unit 7 as the constituent members of the laser interference measuring apparatus 1 are just the same as those already described in FIG. 1, respectively. The abscissa calibration jig 10 is placed as a light beam angle setting mechanism in the convergent optics 8 of the laser interference measuring apparatus 1. Disposition of the abscissa calibration jig 10 is adjusted relatively to the laser interference measuring apparatus 1 so that both the first rotation axis A1 of the first support mechanism 11 and the second rotation axis A2 of the second support mechanism 12 are made to have postures perpendicular to an optical axis A8 of the convergent optics 8, and the rotation center C of the abscissa calibration jig 10 and the focal position 8A of the convergent optics 8 align with each other. Further, the position of the spherical reflector 18 is minutely adjusted to substantially prevent interference fringes from occurring in an image projected onto the light receiving unit 6 (a so-called interference fringe image is a null state generally).

Figure 4:
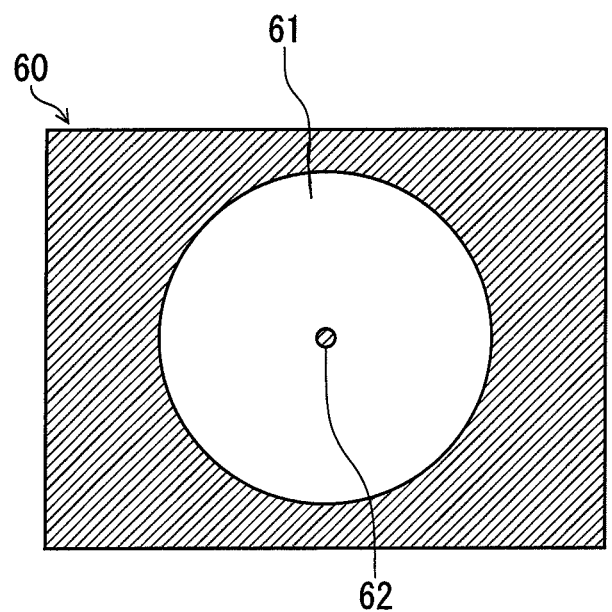
FIG. 4 is a schematic view showing a projection image in the first embodiment.

The abscissa calibration jig 10 incorporated in the convergent optics 8 of the laser interference measuring apparatus 1 receives convergent light which is radiated from the laser light source 2 and passed through the reference standard 5. At the same time, the radiated light is reflected by the spherical reflector 18 so that an image is projected on the light receiving unit 6 in the same path as measurement light. In FIG. 4, a projection image 60 projected on the light receiving unit 6 is an image of a result obtained in such a manner that the light reflected from the abscissa calibration jig 10 is received by the light receiving unit 6 and phase unwrapping operation is performed thereon by the arithmetic processing unit 7. Inside the projection image 60, a bright portion caused by the light reflected from the spherical reflector 18 is observed as a circular visual field range 61, and a dark portion caused by the non-reflective region 17 is observed as a marker 62 inside the bright portion.

In normal measurement of a surface shape, measurement light reflected by the measurement spherical surface 9A is projected together with reference light on the bright portion of the visual field range 61, and displayed as a grayscale or color image showing the surface shape of the measurement spherical surface 9A. On the other hand, during the calibration operation in this embodiment, not the measurement light reflected by the measurement spherical surface 9A but the light reflected from the spherical reflector 18 is returned. When a sphere with a very small shape deviation is used as the spherical reflector 18 and the position thereof is minutely adjusted as described above, an image of interference fringes is observed as null generally. In this case, an image of uniform shading is calculated in the bright portion of the visual field range 61. The light reflected from the spherical reflector 18 does not reach the light receiving unit 6 so that no interference occurs in the dark portion of the marker 62. In the phase unwrapping operation by the arithmetic processing unit 7, the dark portion of the marker 62 is processed as a region having no information about the surface shape. Accordingly, in the projection image 60, the visual field range 61 which is a bright portion having information about the surface shape and the marker 62 which is a dark portion having no information about the same can be distinguished from each other easily by binary coded processing or the like performed on the whole image. As for the dark portion which will be the marker 62, the barycentric position of the region thereof is calculated so that the position of the marker 62 on the projection image 60 or the position of the marker 62 on the visual field range 61 can be identified. Thus, the identified position can be regarded as an actually measured abscissa of the point where the marker 62 is present.

When the spherical reflector 18 is rotated by the first support mechanism 11 and the second support mechanism 12, the abscissa calibration jig 10 can function as a light beam angle setting mechanism for changing the direction of the luminous flux which provides an image of the marker 62. Thus, the marker 62 appearing in the projection image 60 projected on the light receiving unit 6 can be moved. First, both the first support mechanism 11 and the second support mechanism 12 are set at an angle position of zero. As a result, the non-reflective region 17 is positioned at the reference position of the spherical reflector 18, that is, on the surface perpendicular to the optical axis A8 of the convergent optics 8. Thus, the marker 62 appears at the center of the visual field range 61 on the projection image 60. Next, the first support mechanism 11 and the second support mechanism 12 are rotated to direct the spherical reflector 18 to an arbitrary angle. As a result, the position of the non-reflective region 17 on the surface of the spherical reflector 18 also changes to be turned at an arbitrary two-dimensional angle with respect to the optical axis A8 of the convergent optics 8. On this occasion, the position of the marker 62 in the visual field range 61 also moves in the projection image 60.

Figure 5:
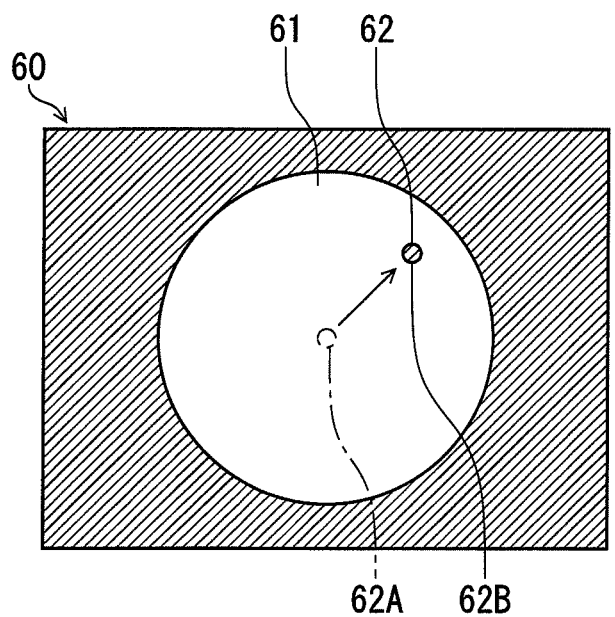
FIG. 5 is a schematic view showing the projection image in the first embodiment.

In FIG. 5, the marker 62 which is at a position 62A when both the first support mechanism 11 and the second support mechanism 12 are at an angle position of zero moves to a position 62B when the first support mechanism 11 and the second support mechanism 12 are rotated. On this occasion, the position of the non-reflective region 17 in the surface of the spherical reflector 18 can be calculated from the respective angle positions of the first support mechanism 11 and the second support mechanism 12. Then, the reference abscissa of a point where the non-reflective region 17 should be in the projection image 60 projected on the light receiving unit 6 can be calculated from the position of the non-reflective region 17 in the surface of the spherical reflector 18. Thus, when the reference abscissa of the marker 62 calculated on the abscissa calibration jig 10 side based on the non-reflective region 17 and the aforementioned actually measured abscissa of the marker 62 on the projection image 60 are compared with each other, the abscissa in the present position of the laser interference measuring apparatus 1 can be calibrated.

In the calibration work of the laser interference measuring apparatus 1, the aforementioned operation is performed on a plurality of angle positions (points on the projection image 60) in the abscissa calibration jig 10, and the reference abscissas based on the set angles of the first support mechanism 11 and the second support mechanism 12 of the abscissa calibration jig 10 and the actually measured abscissas of the marker 62 on the projection image 60 are recorded correspondingly to each other. The correspondence relation between the reference abscissas and the actually measured abscissas obtained thus indicates an abscissa calibration value of the laser interference measuring apparatus 1.

In actual calibration work, for example, calibration values can be acquired from a plurality of angles (set angles of the first support mechanism 11 and the second support mechanism 12) set evenly, for example, by a method for creating a map in which the aforementioned correspondence relation between reference abscissas and actually measured abscissas has been recorded, a method for complementing angles at arbitrary intervals with interpolation of the evaluated correspondence relation, or a method for applying a function using an angle position as a variable. Incidentally, a calibration value to be acquired may be stored in the arithmetic processing unit 7 in advance so that the abscissa of a result of shape calculation can be automatically corrected by reflecting the calibration value on a result of phase operation.

As described above, since the abscissa calibration jig according to this embodiment is placed in the laser interference measuring apparatus 1, abscissas of the laser interference measuring apparatus 1 can be compared or calibrated. In the abscissa calibration jig 10 according to this embodiment, the abscissas of the laser interference measuring apparatus 1 are calibrated in the procedure shown in FIG. 6.

Figure 6:
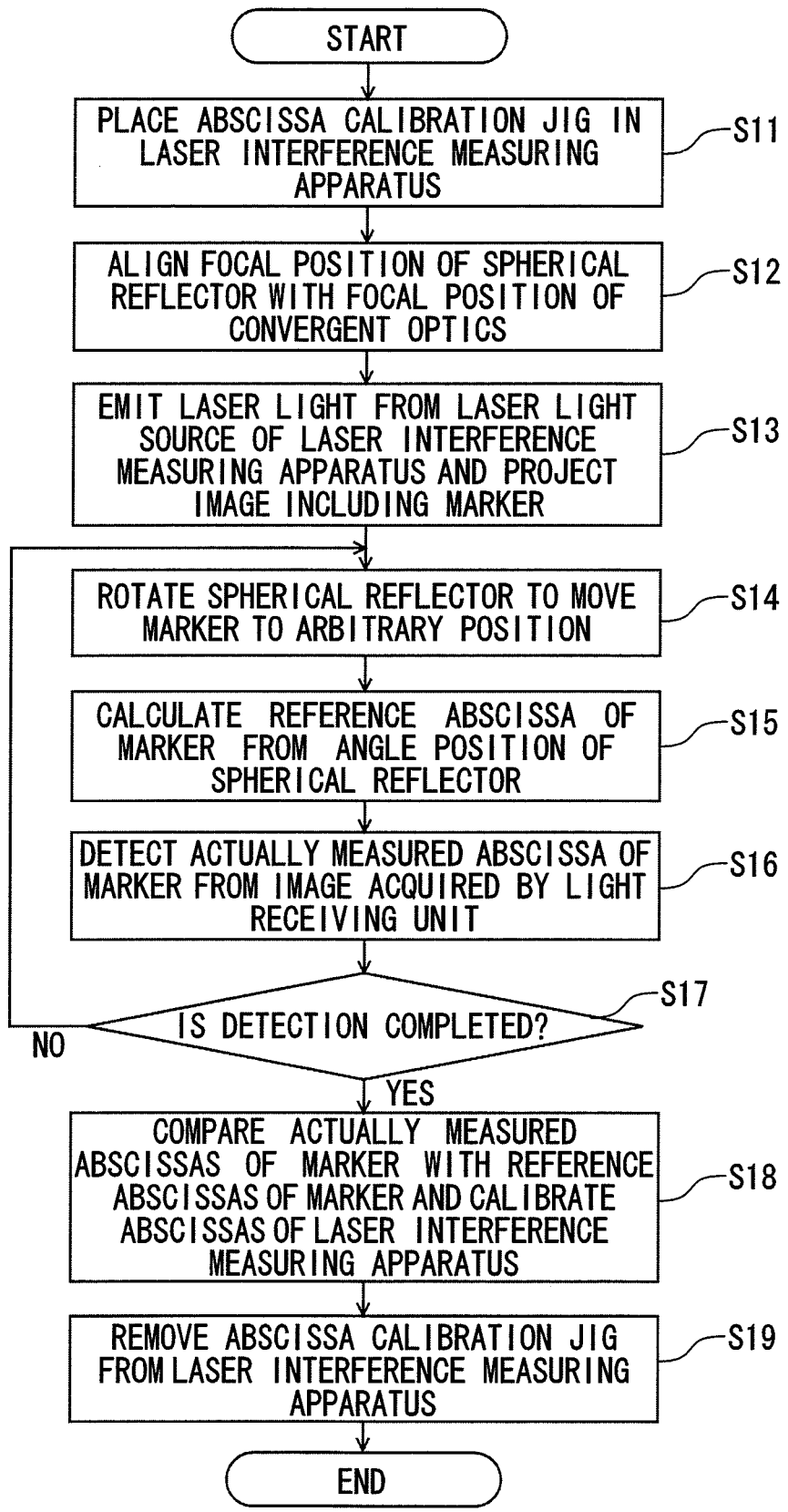
FIG. 6 is a flowchart showing a procedure of calibration in the first embodiment.

In FIG. 6, first, the abscissa calibration jig 10 is placed in the laser interference measuring apparatus 1 as a target to be calibrated (Step S11). When the abscissa calibration jig 10 is placed, the position of the abscissa calibration jig 10 is adjusted so that the rotation center C of the spherical reflector 18 of the abscissa calibration jig 10 aligns with the focal position 8A of the convergent optics 8 of the laser interference measuring apparatus 1 (see FIG. 3) (Step S12). After the adjustment has been made, laser light is emitted from the laser light source 2 of the laser interference measuring apparatus 1 and reflected by the spherical reflector 18 placed in the convergent optics 8 so that the projection image 60 including the marker 62 and the visual field range 61 is projected on the light receiving unit 6 (Step S13).

In the state where the projection image 60 including the marker 62 has been projected on the light receiving unit 6, the first support mechanism 11 and the second support mechanism 12 of the abscissa calibration jig 10 are moved to rotate the spherical reflector 18 so that the position of the marker 62 on the projection image 60 projected on the light receiving unit 6 is moved (see FIG. 5) (Step S14). By the arithmetic processing unit 7, the rotation angles of the first support mechanism 11 and the second support mechanism 12 at the present time are read and the reference abscissa of the marker 62 is calculated from the angle position of the spherical reflector 18 (Step S15). By the arithmetic processing unit 7, the actually measured abscissa of the marker 62 with respect to the visual field range 61 is detected from the projection image 60 acquired by the light receiving unit 6 (Step S16). The data of the reference abscissa and the actually measured abscissa obtained thus are recorded in the arithmetic processing unit 7 in one-to-one correspondence.

Steps S14 to S16 are repeated to rotate the spherical reflector 18 to change the position of the marker 62 until the reference abscissas and the actually measured abscissas of required points are obtained. When the reference abscissas and the actually measured abscissas of all the required points are obtained, detection is completed (Step S17). BY the arithmetic processing unit 7, the data of the reference abscissas and the actually measured abscissas in a plurality of positions of the marker 62 recorded in advance are read, and correction values as abscissas are calculated from differences between the reference abscissas and the actually measured abscissas at the points respectively so that the abscissas of the laser interference measuring apparatus 1 are calibrated (Step S18). When the calibration is completed, the abscissa calibration jig 10 is removed from the laser interference measuring apparatus 1 a target to be calibrated (Step S19). After that, the object to be measured 9 is placed in the convergent optics 8 so that the surface shape of the measurement spherical surface 9A can be measured by the calibrated laser interference measuring apparatus 1.

According to this embodiment configured thus, the following effect can be obtained. In the abscissa calibration jig 10, the image projection unit 19 is supported by the first support mechanism 11 and the second support mechanism 12 and rotated around the first rotation axis A1 and the second rotation axis A2 so that an image can be projected in an arbitrary direction. In order to calibrate the laser interference measuring apparatus 1, the abscissa calibration jig 10 is disposed so that the focal position 8A of the convergent optics 8 of the laser interference measuring apparatus 1 to be calibrated aligns with the rotation center C of the abscissa calibration jig 10, and an image is projected from the image projection unit 19 so that the image is received by the light receiving unit 6 of the laser interference measuring apparatus 1. The projection image 60 projected thus has the marker 62 at a point on the visual field range 61 thereof. Distortion or the like in the convergent optics 8 of the laser interference measuring apparatus 1 can be detected by examination of the correspondence between the coordinates (actually measured abscissas) of the marker 62 and the coordinates (reference abscissas) calculated from the current angle positions of the first support mechanism 11 and the second support mechanism 12 of the abscissa calibration jig 10. Such correspondence between the abscissas is examined on a part or all of points on the light receiving unit 6, and correction values are calculated so that the abscissas of the laser interference measuring apparatus 1 can be calibrated easily and precisely.

In the abscissa calibration jig 10 according to this embodiment, the spherical reflector 18 having the non-reflective region 17 formed in the surface is used as the image projection unit 19. The spherical reflector 18 is disposed in the focal position 8A of the convergent optics 8 of the laser interference measuring apparatus 1, and convergent luminous flux is emitted from the laser light source 2 of the laser interference measuring apparatus 1. Thus, light is reflected from the spherical reflector 18, and the projection image 60 is projected on the light receiving unit 6 of the laser interference measuring apparatus 1. On this occasion, a dark portion caused by the non-reflective region 17 is formed as the marker 62 in the projection image 60. Thus, calibration can be performed based on the relation between the aforementioned marker 62 on the light receiving unit 6 and the angle positions of the first support mechanism 11 and the second support mechanism 12.

Accordingly, in the abscissa calibration jig 10 according to this embodiment, the laser light source 2 of the laser interference measuring apparatus 1 can be also used as a light source for obtaining the projection image 60 so that the apparatus configuration can be simplified. Further, the abscissa calibration jig 10 may include only the spherical reflector 18 having the non-reflective region 17 formed in the surface, and the first support mechanism 11 and the second support mechanism 12 for supporting the spherical reflector 18. Accordingly, the abscissa calibration jig 10 can be made compact as a jig, and easily placed in the convergent optics 8 in place of the object to be measured 9. Thus, it is also possible to reduce the cost as a jig.

[Second Embodiment]

FIGS. 7 to 11 show a second embodiment of the invention. In this embodiment, an abscissa calibration jig 20 (see FIG. 7) according to the invention is applied to the aforementioned laser interference measuring apparatus 1 in FIG. 1 so as to calibrate the abscissas of the laser interference measuring apparatus 1 in a procedure based on an abscissa calibration method according to the invention.

Figure 7:
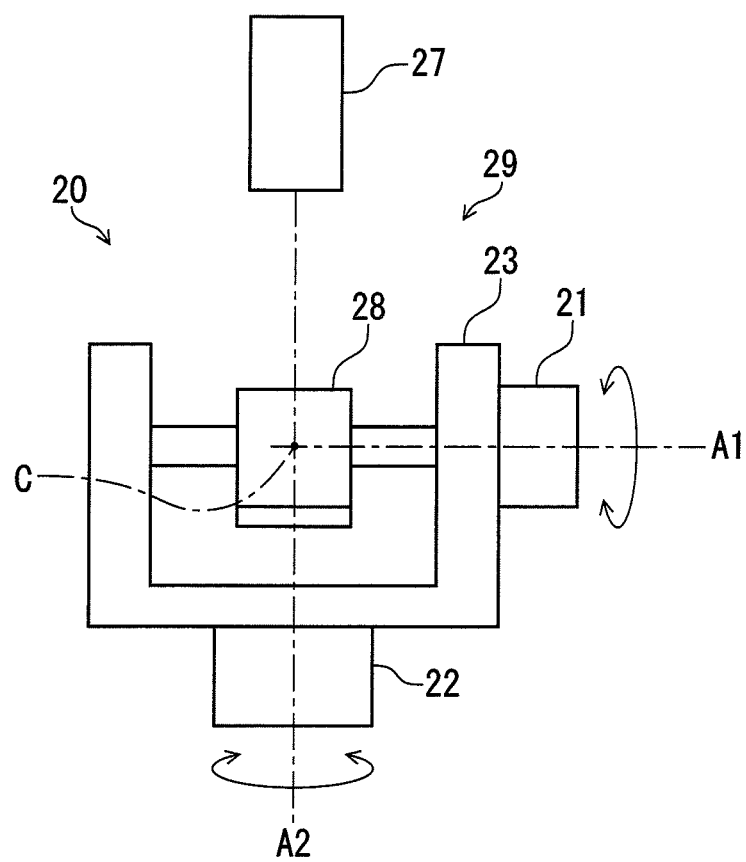
FIG. 7 is a schematic view showing a main portion of a second embodiment of the invention.

In FIG. 7, the abscissa calibration jig 20 has a first support mechanism 21, a second support mechanism 22, a frame 23 and an image projection unit 29. The first support mechanism 21 is placed on the frame 23 so as to support the image projection unit 29 rotatably around a first rotation axis A1. The first rotation axis A1 passes a predetermined rotation center C. The second support mechanism 22 supports the first support mechanism 21 through the frame 23 rotatably around a second rotation axis A2. The second rotation axis A2 crosses the first rotation axis A1 at the rotation center C.

Not-shown drive units such as motors for rotating the first support mechanism 21 and the second support mechanism 22 in accordance with operation commands from the arithmetic processing unit 7 are attached to the first support mechanism 21 and the second support mechanism 22 respectively. In addition, angle detectors for detecting the rotation angle positions of the first support mechanism 21 and the second support mechanism 22 are attached to the first support mechanism 21 and the second support mechanism 22 respectively, so that the arithmetic processing unit 7 can detect the angle position around the first rotation axis A1 and the angle position around the second rotation axis A2 and infer the direction of the image projection unit 29 from the detected angle positions.

The image projection unit 29 projects an image with a marker on the light receiving unit 6. The image projection unit 29 has a planar reflector 28 and a laser light source 27 for emitting laser light to the surface of the planar reflector 28. The planar reflector 28 has a flat reflective surface and is rotatably supported by the first support mechanism 21 and the second support mechanism 22. In the planar reflector 28, the first rotation axis A1 is disposed to cross the reflective surface of the planar reflector 28, and set so that the rotation center C which is an intersecting point between the first rotation axis A1 and the second rotation axis A2 comes to one point on the reflective surface of the planar reflector 28. Therefore, even when the planar reflector 28 is rotated around the first rotation axis A1 and the second rotation axis A2 by the first support mechanism 21 and the second support mechanism 22, the point corresponding to the rotation center C on the reflective surface can keep its position while only the direction thereof is changed.

The laser light source 27 is fixed to the outside of the first support mechanism 21 and the second support mechanism 22, but not supported rotatably. Disposition of the laser light source 27 is adjusted so that laser light emitted from the laser light source 27 can be thrown to the point corresponding to the rotation center C on the reflective surface of the planar reflector 28. In the laser light source 27, the light quantity of laser light to be emitted is set to be much higher than the light quantity of reference light (emitted from the laser light source 2, reflected by the reference standard 5 and returned to the light receiving unit 6) in the laser interference measuring apparatus 1 as a target to be calibrated.

Figure 8:
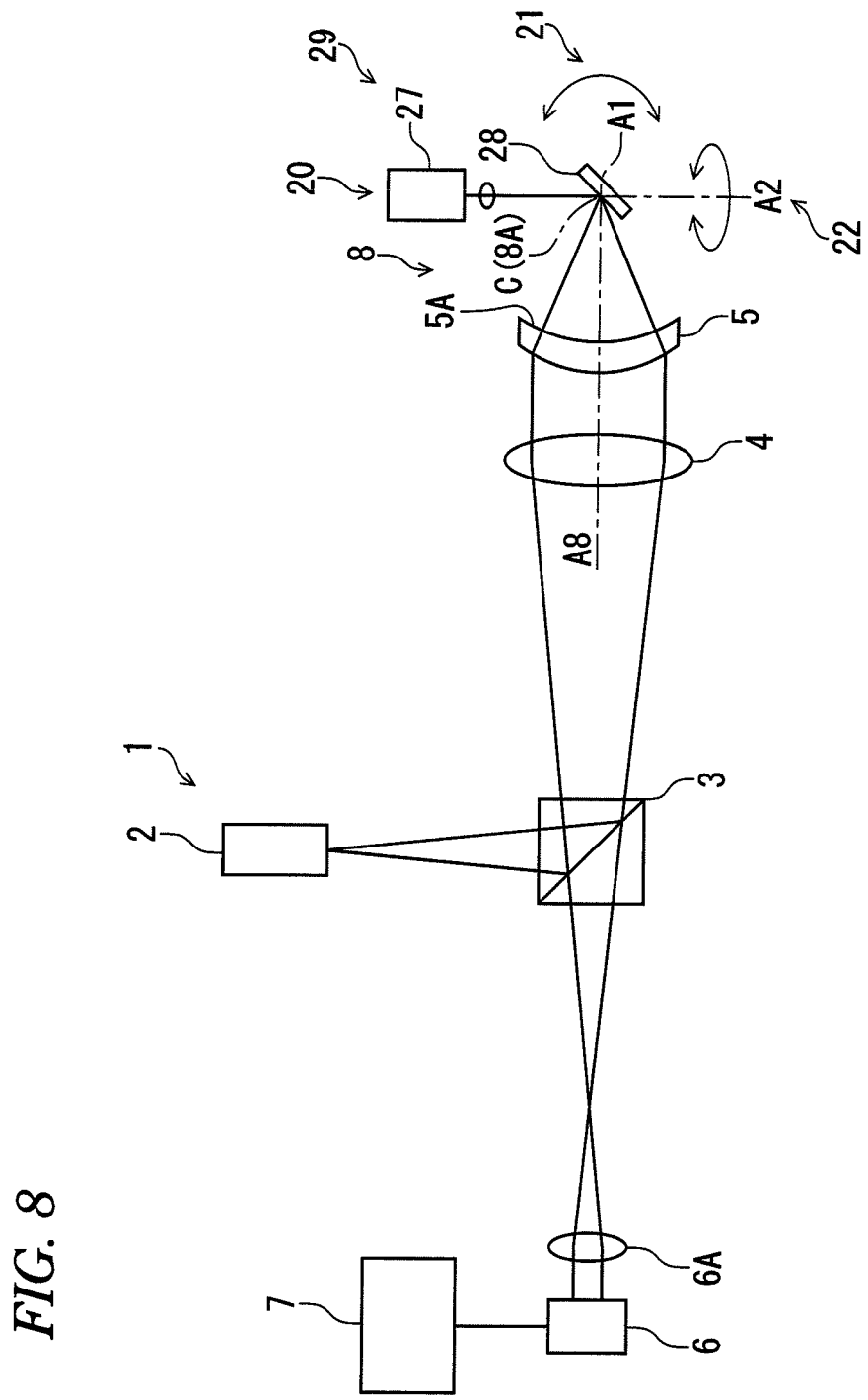
FIG. 8 is a schematic view showing an apparatus configuration of the second embodiment.

In this embodiment, the aforementioned abscissa calibration jig 20 in FIG. 7 is incorporated in the aforementioned laser interference measuring apparatus 1 in FIG. 1 for performing calibration work. In FIG. 8, the laser interference measuring apparatus 1 and the laser light source 2, the semitransparent mirror 3, the collimator lens 4, the reference standard 5, the observation optics 6A, the light receiving unit 6 and the arithmetic processing unit 7 as the constituent members of the laser interference measuring apparatus 1 are just the same as those already described in FIG. 1, respectively. The abscissa calibration jig 20 is placed as a light beam angle setting mechanism in the convergent optics 8 of the laser interference measuring apparatus 1.

Disposition of the abscissa calibration jig 20 is adjusted relatively to the laser interference measuring apparatus 1 so that both the first rotation axis A1 of the first support mechanism 21 and the second rotation axis A2 of the second support mechanism 22 are made to have postures perpendicular to the optical axis A8 of the convergent optics 8 and the rotation center C of the abscissa calibration jig 20 and the focal position 8A of the convergent optics 8 align with each other. The planar reflector 28 is adjusted so that the state in which the angle position around the first rotation axis A1 is 45 degrees with respect to the optical axis A8 of the convergent optics 8 (a state in which laser light emitted from the laser light source 27 along the second rotation axis A2 is reflected along the optical axis A8 of the convergent optics 8) and the angle position around the second rotation axis A2 is perpendicular to the optical axis A8 of the convergent optics 8 is set as a default position.

Figure 9:
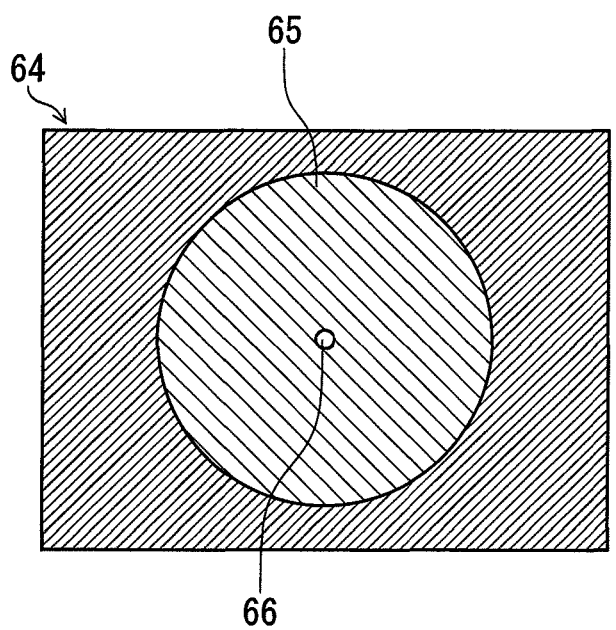
FIG. 9 is a schematic view showing a projection image in the second embodiment.

In the abscissa calibration jig 20 incorporated in the convergent optics 8 of the laser interference measuring apparatus 1, laser light emitted from the laser light source 27 is reflected by the planar reflector 28 so that an image is projected on the light receiving unit 6 along the same path as measurement light of the convergent optics 8. In FIG. 9, a projection image 64 projected on the light receiving unit 6 is a light intensity image obtained when the reference light of the laser interference measuring apparatus 1 and the light projected from the abscissa calibration jig 20 are received by the light receiving unit 6. Inside the projection image 64, a slightly dark circular visual field range 65 caused by the reference light (emitted from the laser light source 2, reflected by the reference standard 5 and returned to the light receiving unit 6) of the laser interference measuring apparatus 1 is observed, and a bright light spot caused by the intensive laser light from the laser light source 27 is observed as a marker 66 inside the visual field range 65.

In normal measurement of a surface shape, measurement light reflected by the measurement spherical surface 9A is projected together with the reference light on the visual field range 65, and displayed as a grayscale or color image showing the surface shape of the measurement spherical surface 9A. On the other hand, during the calibration operation in this embodiment, not the measurement light reflected by the measurement spherical surface 9A but only the reference light is projected. Thus, the visual field range 65 is formed as a light intensity image with generally uniform shading. The marker 66 is formed by light emitted from the laser light source 27, reflected by the planar reflector 28 and reaching the light receiving unit 6. In the light receiving unit 6, therefore, the marker 66 overlaps with the reference light of the laser interference measuring apparatus 1. Because the light sources are different from each other, there is however no fear that interference fringes may occur. Accordingly, in the projection image 64, the comparatively dark visual field range 65 and the sufficiently bright marker 66 can be distinguished easily by binary coded processing or the like performed on the whole image. As for the marker 66, the barycentric position of the region thereof is calculated so that the position of the marker 66 on the projection image 64 or the position of the marker 66 on the visual field range 65 can be identified. Thus, the identified position can be regarded as an actually measured abscissa of a point where the marker 66 is present.

When the planar reflector 28 is rotated by the first support mechanism 21 and the second support mechanism 22, the abscissa calibration jig 20 functions as a light beam angle setting mechanism for changing the direction of luminous flux which provides an image of the marker 66. Thus, the marker 66 appearing in the projection image 64 projected on the light receiving unit 6 can be moved. First, both the first support mechanism 21 and the second support mechanism 22 are set at predetermined positions respectively. As a result, laser light emitted along the second rotation axis A2 from the laser light source 27 is reflected along the optical axis 8A of the convergent optics 8. Thus, the marker 66 appears at the center of the visual field range 65 on the projection image 64.

Then, the first support mechanism 21 and the second support mechanism 22 are rotated to direct the planar reflector 28 to an arbitrary angle. As a result, the direction of the laser light reflected by the planar reflector 28 can be turned at an arbitrary two-dimensional angle with respect to the optical axis A8 of the convergent optics 8. On this occasion, the position of the marker 66 in the visual field range 65 also moves in the projection image 64.

Figure 10:
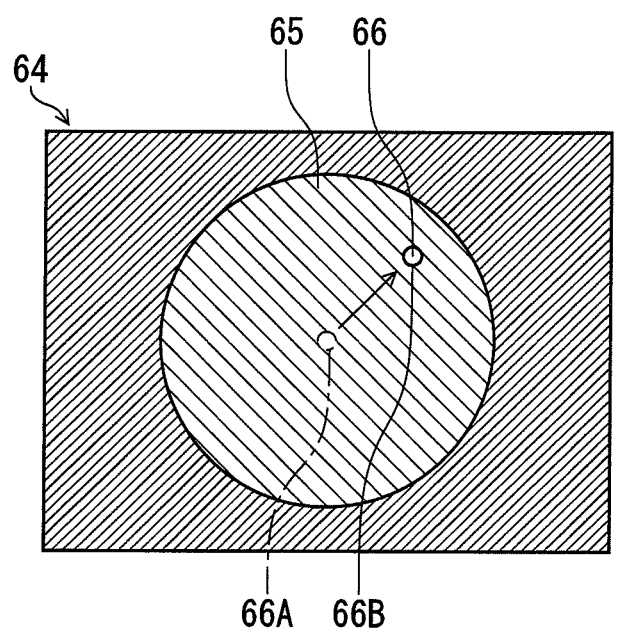
FIG. 10 is a schematic view showing the projection image in the second embodiment.

In FIG. 10, the marker 66 which is at a position 66A when both the first support mechanism 21 and the second support mechanism 22 are at the predetermined positions moves to a position 66B when the first support mechanism 21 and the second support mechanism 22 are rotated. On this occasion, the reference abscissa of the point where the marker 66 should be in the projection image 64 projected on the light receiving unit 6 can be calculated from the angle positions of the first support mechanism 21 and the second support mechanism 22 by the arithmetic processing unit 7. Thus, when the reference abscissa of the marker 66 calculated on the abscissa calibration jig 20 side and the aforementioned actually measured abscissa of the marker 66 on the projection image 64 are compared with each other, the abscissa in the present position of the laser interference measuring apparatus 1 can be calibrated.

In the calibration work of the laser interference measuring apparatus 1, the aforementioned operation is performed on a plurality of angle positions (points on the projection image 64) in the abscissa calibration jig 20, and the reference abscissas based on the set angles of the first support mechanism 21 and the second support mechanism 22 of the abscissa calibration jig 20 and the actually measured abscissas of the marker 66 on the projection image 64 are recorded correspondingly to each other. The correspondence relation between the reference abscissas and the actually measured abscissas obtained thus indicates an abscissa calibration value of the laser interference measuring apparatus 1.

In actual calibration work, for example, calibration values can be acquired from a plurality of angles (set angles of the first support mechanism 21 and the second support mechanism 22) set evenly, for example, by a method for creating a map in which the aforementioned correspondence relation between reference abscissas and actually measured abscissas has been recorded, a method for complementing angles at arbitrary intervals with interpolation of the evaluated correspondence relation, or a method for applying a function using an angle position as a variable. Incidentally, a calibration value to be acquired be may stored in the arithmetic processing unit 7 in advance so that the calibration value can be reflected on a result of phase operation so as to automatically correct the abscissa of a result of shape calculation.

As described above, when the abscissa calibration jig according to this embodiment is placed in the laser interference measuring apparatus 1, abscissas of the laser interference measuring apparatus 1 can be compared or calibrated. In the abscissa calibration jig 20 according to this embodiment, the abscissas of the laser interference measuring apparatus 1 are calibrated in the procedure shown in FIG. 11.

Figure 11:
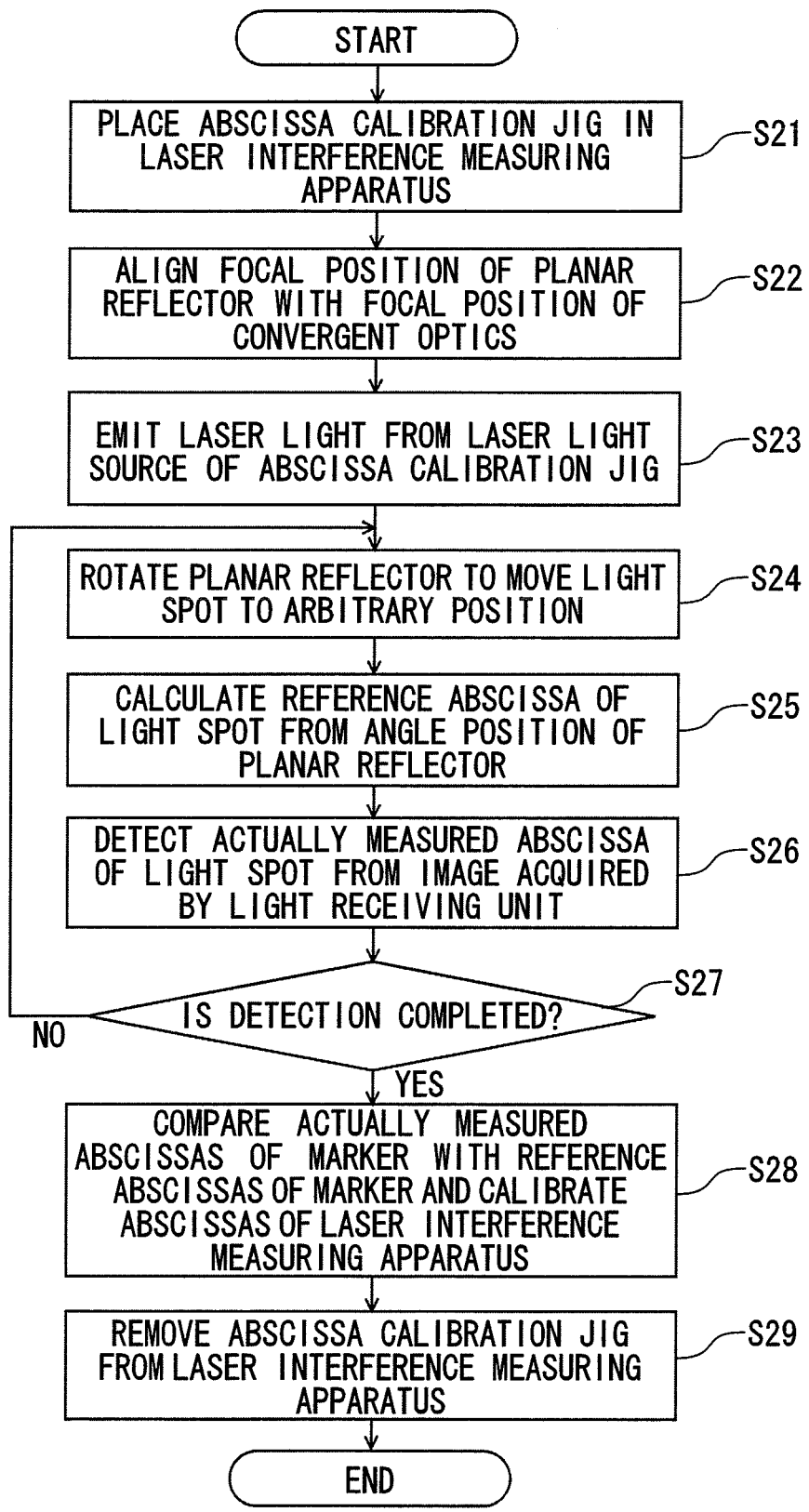
FIG. 11 is a flowchart showing a procedure of calibration in the second embodiment.

In FIG. 11, first, the abscissa calibration jig 20 is placed in the laser interference measuring apparatus 1 as a target to be calibrated (Step S21). When the abscissa calibration jig 20 is placed, the position of the abscissa calibration jig 20 is adjusted so that the rotation center C of the planar reflector 28 of the abscissa calibration jig 20 aligns with the focal position 8A of the convergent optics 8 of the laser interference measuring apparatus 1 (see FIG. 8) (Step S22). After the adjustment has been made, laser light is emitted from the laser light source 27 of the abscissa calibration jig 20 and reflected by the planar reflector 28 placed in the convergent optics 8 so that the projection image 64 including the marker 66 and the visual field range 65 is projected on the light receiving unit 6 (Step S23).

In the state where the projection image 64 including the marker 66 has been projected on the light receiving unit 6, the first support mechanism 21 and the second support mechanism 22 of the abscissa calibration jig 20 are moved to rotate the planar reflector 28. Thus, the position of the marker 66 on the projection image 64 projected on the light receiving unit 6 is moved (see FIG. 5) (Step S24). By the arithmetic processing unit 7, the rotation angles of the first support mechanism 21 and the second support mechanism 22 at the present time are read and the reference abscissa of the marker 66 is calculated from the angle position of the planar reflector 28 (Step S25). By the arithmetic processing unit 7, the actually measured abscissa of the marker 66 with reference to the visual field range 65 is detected from the projection image 64 acquired by the light receiving unit 6 (Step S26). The data of the reference abscissa and the actually measured abscissa obtained thus are recorded in the arithmetic processing unit 7 in one to one correspondence.

Steps S24 to S26 are repeated to rotate the planar reflector 28 to change the position of the marker 66 until the reference abscissas and the actually measured abscissas of required points are obtained. When the reference abscissas and the actually measured abscissas of all the required points are obtained, detection is completed (Step S27). BY the arithmetic processing unit 7, the data of the reference abscissas and the actually measured abscissas in a plurality of positions of the marker 66 recorded in advance are read, and correction values as abscissas are calculated from differences between the reference abscissas and the actually measured abscissas at the points respectively so that the abscissas of the laser interference measuring apparatus 1 are calibrated (Step S28). When the calibration is completed, the abscissa calibration jig 20 is removed from the laser interference measuring apparatus 1 as a target to be calibrated (Step S29). After that, the object to be measured 9 is placed in the convergent optics 8 so that the surface shape of the measurement spherical surface 9A can be measured by the calibrated laser interference measuring apparatus 1.

According to the aforementioned embodiment, the following effect can be obtained. In the abscissa calibration jig 20, the image projection unit 29 is supported by the first support mechanism 21 and the second support mechanism 22 and rotated around the first rotation axis A1 and the second rotation axis A2 so that an image can be projected in an arbitrary direction. In order to calibrate the laser interference measuring apparatus 1, the abscissa calibration jig 20 is disposed so that the focal position 8A of the convergent optics 8 of the laser interference measuring apparatus 1 to be calibrated aligns with the rotation center C of the abscissa calibration jig 20, and an image is projected from the image projection unit 29 so that the image can be received by the light receiving unit 6 of the laser interference measuring apparatus 1. The projection image 64 projected thus has the marker 66 at a point on the visual field range 65 thereof. Distortion or the like in the convergent optics 8 of the laser interference measuring apparatus 1 can be detected by examination of the correspondence between the coordinates (actually measured abscissas) of the marker 66 and the coordinates (reference abscissas) calculated from the current angle positions of the first support mechanism 21 and the second support mechanism 22 of the abscissa calibration jig 20. Such correspondence between the abscissas is examined on a part or all of points on the light receiving unit 6, and correction values are calculated so that the abscissas of the laser interference measuring apparatus 1 can be calibrated easily and precisely.

In the abscissa calibration jig 20 according to this embodiment, the planar reflector 28 rotatably supported by the first support mechanism 21 and the second support mechanism 22 is used as the image projection unit 29 so that the rotation center C of the planar reflector 28 is disposed on the focal position 8A of the convergent optics 8 of the laser interference measuring apparatus 1. Laser light is emitted from the laser light source 27 of the abscissa calibration jig 20 so that light is reflected from the planar reflector 28, passed through the convergent optics 8 and returned in the same path as the measurement light with the result that the projection image 64 is projected on the light receiving unit 6 of the laser interference measuring apparatus 1. On this occasion, a light spot caused by the laser light from the laser light source 27 is formed as a marker 66 in the projection image 64. Accordingly, calibration can be performed based on the relation between the aforementioned marker 66 on the light receiving unit 6 and the angle positions of the first support mechanism 21 and the second support mechanism 22.

Accordingly, the abscissa calibration jig 20 according to this embodiment uses a configuration in which laser light from the laser light source 27 is reflected by the planar reflector 28 in order to obtain the projection image 64. A general laser light source can be used as the laser light source 27. In addition, the planar reflector 28 may be a planar mirror so that it is possible to improve the accuracy while reducing the cost, compared with a spherical reflective surface or the like. Further, the abscissa calibration jig 20 may include only the general laser light source 27, the planar reflector 28, and the first support mechanism 11 and the second support mechanism 12 for supporting the planar reflector 28. Accordingly, the abscissa calibration jig 20 can be made compact as a jig, and easily placed in the convergent optics 8 in place of the object to be measured 9. Thus, it is also possible to reduce the cost as a jig.

[Other Embodiments]

The invention is not limited to the aforementioned embodiments, but modifications or the like capable of attaining the object of the invention are included in the invention. The aforementioned embodiments have been described in the case where the laser interference measuring apparatus 1 is a Fizeau interferometer. However, the type of the laser interferometer is not limited thereto. For example, abscissas can be identified in the same principle even when a Twyman-Green interferometer etc. is used. When a Twyman-Green interferometer is used, a light intensity image formed by only measurement light can be acquired easily if reference light is shielded. Thus, for example, in the first embodiment, the position of the non-reflective region 17 on an image can be detected more easily. In the first embodiment, the same principle is established in the configuration in which the spherical reflector 18 and the non-reflective region 17 are reversed to each other (the marker 62 corresponds to a bright portion surrounded by a dark portion). In this case, however, an interference region is limited in measurement for aligning the rotation center C of the spherical reflector 18 with the focal position 8A of the convergent optics of the laser interference measuring apparatus 1 so that it is difficult to confirm an image of interference fringes. It is therefore desirable to use the configuration shown in the first embodiment.

What is claimed is:

1. An abscissa calibration jig of a laser interference measuring apparatus, comprising:
   a spherical reflector configured to project an image with a marker, the spherical reflector including a non-reflective region forming the marker in a surface of the spherical reflector;
   a first support configured to rotatably support the spherical reflector and rotate around a first rotation axis passing a predetermined rotation center of the spherical reflector; and
   a second support configured to rotatably support the first support and rotate around a second rotation axis crossing the first rotation axis at the rotation center of the spherical reflector, wherein the spherical reflector uses the rotation center as a center of curvature.

2. An abscissa calibration jig of a laser interference measuring apparatus, comprising:
   an image projection unit configured to project an image with a marker, the image projection unit including a planar reflector in which the rotation center is set at one point on a reflective surface thereof, and further including a laser light source which irradiates the planar reflector with laser light for forming the marker;
   a first support configured to rotatably support the image projection unit around a first rotation axis passing a predetermined rotation center; and
   a second support configured to rotatably support the first support around a second rotation axis crossing the first rotation axis at the rotation center of the first support.

3. An abscissa calibration method of a laser interference measuring apparatus, comprising:
   using an abscissa calibration jig of a laser interference measuring apparatus, including: an image projection unit configured to project an image with a marker; a first support mechanism configured to rotatably support the image projection unit around a first rotation axis passing a predetermined rotation center; and a second support mechanism configured to rotatably support the first support mechanism around a second rotation axis crossing the first rotation axis at the rotation center;
   placing the abscissa calibration jig in a focal position of a convergent optics of the laser interference measuring apparatus, and aligning the rotation center with the focal position;
   projecting an image from the image projection unit onto a light receiving unit of the laser interference measuring apparatus;
   rotating the image projection unit around the first rotation axis and the second rotation axis to move the marker to an arbitrary position on the image;
   calculating a reference abscissa of the marker from angle positions of the image projection unit around the first rotation axis and the second rotation axis;
   detecting an actually measured abscissa of the marker in the image acquired by the light receiving unit; and
   comparing the actually measured abscissa and the reference abscissa of the marker and calibrating an abscissa of the laser interference measuring apparatus.

* * * * *